March 23, 1971    H. BRANDT ET AL    3,572,425
ROTARY REGENERATIVE HEAT EXCHANGERS
Filed Oct. 9, 1969    4 Sheets-Sheet 1

Inventors
HERBERT BRANDT
GERHARD KRITZLER
By
Lackenbach & Lackenbach
Attorneys

March 23, 1971  H. BRANDT ET AL  3,572,425

ROTARY REGENERATIVE HEAT EXCHANGERS

Filed Oct. 9, 1969  4 Sheets-Sheet 3

Inventors
HERBERT BRANDT
GERHARD KRITZLER
By
Wachenbach + Wachenbach
Attorneys

March 23, 1971  H. BRANDT ET AL  3,572,425
ROTARY REGENERATIVE HEAT EXCHANGERS
Filed Oct. 9, 1969  4 Sheets-Sheet 4

Inventors
HERBERT BRANDT
GERHARD KRITZLER
By
Rackenbach + Rackenbach
Attorneys

United States Patent Office 3,572,425
Patented Mar. 23, 1971

3,572,425
ROTARY REGENERATIVE HEAT EXCHANGERS
Herbert Brandt, Rothemuhle, and Gerhard Kritzler, Freudenberg, Germany, assignors to Apparatebau Rothemuhle, Brandt & Kritzler, Westphalia, Germany
Filed Oct. 9, 1969, Ser. No. 865,053
Claims priority, application Germany, Feb. 13, 1969, P 19 07 073.6; Feb. 24, 1969, P 19 09 101.1; Great Britain, May 9, 1969, 23,850/69
Int. Cl. F28d 19/04
U.S. Cl. 165—9                                    12 Claims

ABSTRACT OF THE DISCLOSURE

A rotary regenerative air preheater has, when cold, non-planar axial end faces of the regenerator mass, preformed so that upon thermal deformation in use they attain a substantially planar condition. The preheater has independently movable annular portions, for use in situations where a large regenerator is needed. Specific interengaging members between the two concentric portions are shown, including one wherein a projection on one portion enters into a recess in the side wall of the other portion.

BACKGROUND OF THE INVENTION

The present invention concerns regenerative heat exchangers, and concerns both the system of air preheaters with stationary heating surfaces and rotating connecting ducts, and the system of air preheaters with rotating heating surfaces and stationary connecting ducts.

In specification No. 3,369,593 there was described a regenerator concerned to reduce the overall effect of the calotte-shaped warping of the regenerator front surfaces, which is caused by thermal expansion, to reduce the stresses occurring, and at the same time make easier the sealing of the connecting cross-sections for the heat exchanging media on the regenerator front surfaces.

This possibility for expansion and deformation of the two co-axial portions independent of each other, which has been provided, is necessary because differing thermal expansions will occur under different operating temperatures and because they may change after a longer operating period by deformation or wear of constructive parts. Particularly in case of the presently customary large regenerator diameters of the order of 8 to 10 m. and more, locally unequal thermal expansions may be caused at different circumferential points being due to the formation of strands of gas and air of varying temperatures or volumes.

If the concentrically sub-divided supporting structure of this type is used for regenerative air preheaters, in which several air flows are heated up to different temperatures, the supporting structure will be subject to thermal expansions, which greatly differ locally, so that a correspondingly greater flexibility of the connection of the part-units becomes essential.

SUMMARY OF THE INVENTION

We now propose to give the front surfaces of the concentrically sub-divided regenerator a pre-warping by giving, preferably by machining, in those faces a concavity at the end destined to be the hot end and a convexity at the end destined to be the cold end. This amounts to a pre-warping in opposite direction to that which is to be expected later on under operating conditions. The pre-warping may be in the form of an arcuate convexity and concavity, or a conical convexity or concavity. The size of this pre-warping may be chosen in exact conformity with the size of the warping otherwise occurring in opposite direction under an average operating temperature, so that under this average operating temperature the pre-warping of the regenerator front surfaces existing in cold condition will practically be cancelled out completely by the thermal expansion.

We also show certain forms of modified interengaging means.

Figure 1:
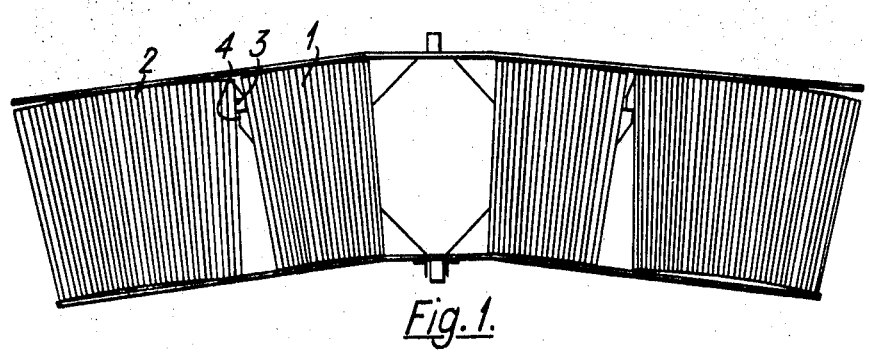
Figure 2:
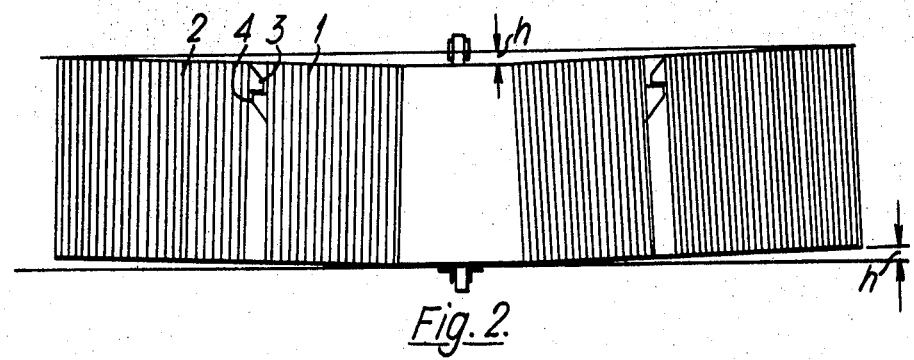
Figure 3:
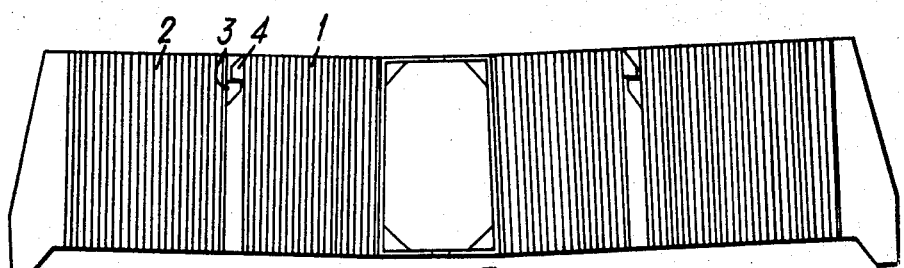
Figure 4A:
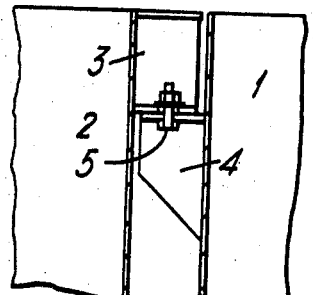
Figure 5A:
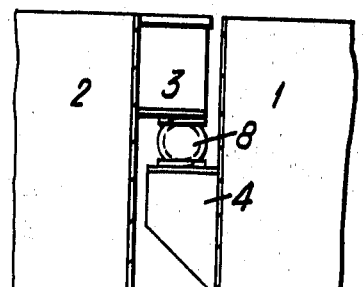
Figure 4B:
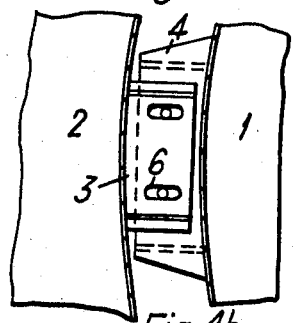
Figure 5B:
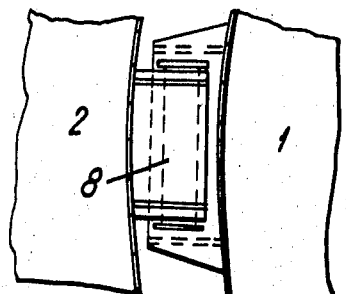
Figure 6A:
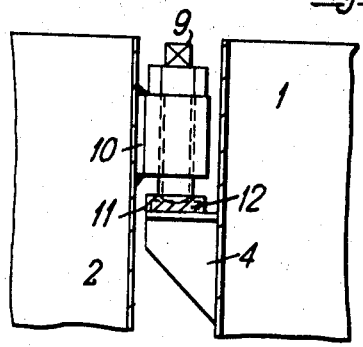
Figure 6B:
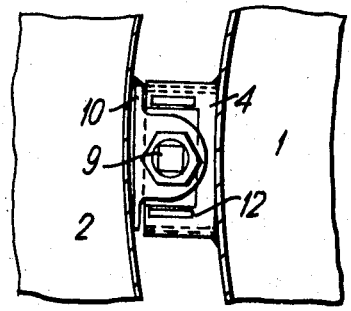
Figure 7A:
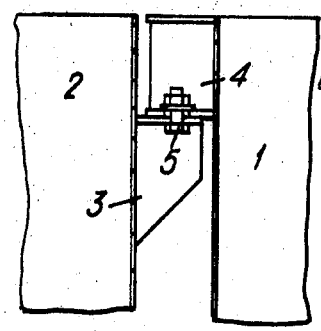
Figure 8A:
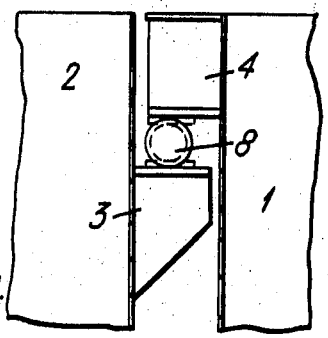
Figure 7B:
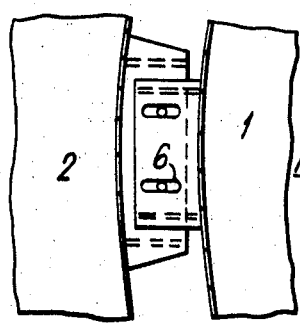
Figure 8B:
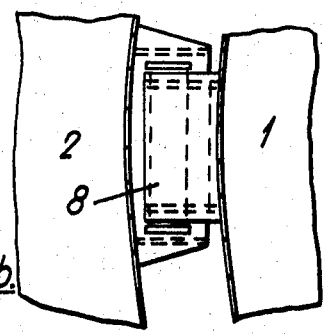
Figure 9A:
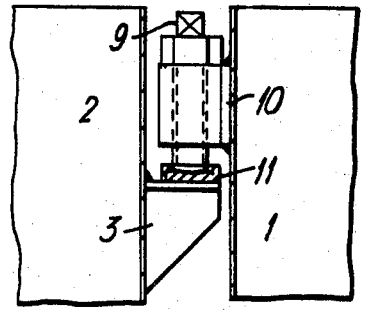
Figure 9B:
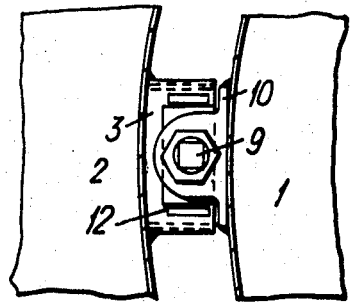
Figure 10A:
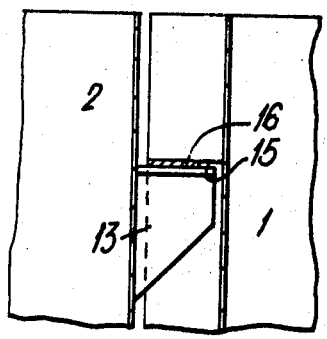
Figure 10B:
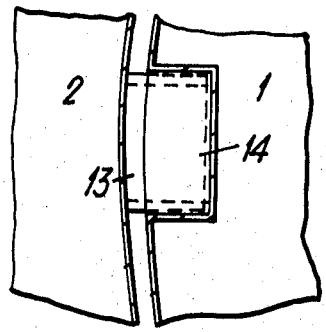
Figure 11A:
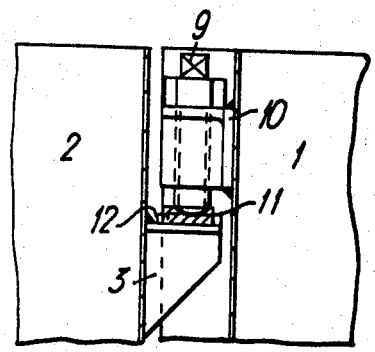
Figure 11B:
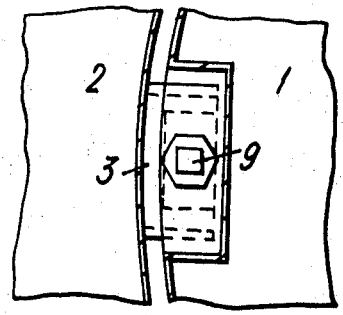

Particular embodiments will now be described with reference to the accompanying drawings, wherein:

FIG. 1 shows in cross-section a regenerator structure embodying the invention of the parent specification, FIGS. 2 and 3 show in cross-section a regenerator rotor and stator, respectively, embodying the present invention, FIGS. 4a and 4b show in side view and plan, respectively, a form of bracket interconnection, FIGS. 5a and 5b show in side view and plan, respectively, a second form of bracket interconnection, FIGS. 6a and 6b show in side view and plan, respectively, a third form of bracket interconnection, FIGS. 7a and 7b show in side view and plan, respectively, a fourth form of bracket interconnection, FIGS. 8a and 8b show in side view and plan, respectively, a fifth form of bracket interconnection, FIGS. 9a and 9b show in side view and plan, respectively, a sixth form of bracket interconnection, FIGS. 10a and 10b show in side view and plan, respectively, a seventh form of bracket interconnection, and FIGS. 11a and 11b show in side view and plan, respectively, an eighth form of bracket interconnection.

The drawings FIGS. 1 to 3 show schematically and by way of example, the cross-sections of regenerator chambers, the supporting structure of which is composed of two annular portions being arranged concentrically to each other, said portions supporting each other reciprocally freely adjustable.

FIG. 1 shows a form generally as shown in the parent specification, namely after occurrence of thermal expansion under operating temperature with the regenerator front surfaces, which were planar when cold, being warped correspondingly.

FIG. 2 shows a form of embodiment of the present invention for the supporting structure of a rotating heat storage mass. This is shown in cold condition, in which the front surface is concave, being designed as a conical surface in opposite direction to the calotte-shaped warping which will occur under operating temperatures. These front surfaces could be machined with according calotte-shaped pre-warpings. It is however in practise sufficient to provide a moderate conical preinclination of the front surfaces for compensation of the medium thermal expansion, which simplifies at the same time the machining of these surfaces since the individual portions have planar faces.

The height $h$ is the amount of warping expected to occur under average working conditions.

In FIGS. 2 and 3 as well as in FIG. 1 the upper regenerator front surfaces are situated at the hot end of the regenerator. In FIGS. 2 and 3 these front surfaces are therefore designed concavely, whilst the lower front surfaces on the cold end are convexly pre-machined.

FIG. 3 shows a form of embodiment for a stationary heat storage body (stator).

Compared to what is shown in the parent specification this innovation offers above all the advantage that even in case of comparatively high operating temperatures and great temperature differences within the regenerator chamber, strongly differing deformations of the concentric portions, which are supported on each other, can be cancelled or compensated to the greatest possible extent.

FIGS. 4a to 11b show constructive details of different interengaging means, by means of which annular portions of the supporting structure of the regenerator as defined, which are arranged concentrically to each other, are supported freely adjustable on each other. These annular portions can still be further sub-divided in circumferential direction in order to facilitate erection and transport. They may have front surfaces which are concave or convex overall, as shown in FIGS. 2 and 3, when cold, or may be planar in that state.

In all figures the inner and outer concentric portions have been indicated by reference numbers 1 and 2, and for all figures it is assumed that the warmer regenerator end is located at the top.

In the forms shown in FIGS. 1 to 3, 4a and 4b and 7a and 7b the support of the portions 1 and 2 is effected by means of the supporting brackets 3 and 4. The connection bolts 5 for the supporting brackets 3 and 4 are arranged in slotted holes 6, which allow a reciprocally free thermal expansion of the inner and outer portions 1 and 2 to a greater extent than the play.

In the design shown in FIGS. 5a and 5b and in FIGS. 8a and 8b, the supporting claws 3 and 4 can be moved in radial direction glidingly against each other by means of rollers 8, whereby the free adjustability of the concentric portions 1 and 2 is assured. FIGS. 6a and 6b show an outer portion 2 supported on accordingly arranged cantilevers 4 of the inner cylindrical rotor part 1 by means of an adjusting bolt 9. Three or more of these are uniformly distributed around the circumference of the portions. The lower end of each adjusting bolt 9 is spherically rounded off and is resting in a ball cup 11, which can move in radial direction between two guide bars 12, in order to follow the thermal expansion.

The adjusting bolts 9 allow, on erection, the exact adjustment of the various elevations of the outer and inner regenerator front surfaces to each other, whereby any probable degree of manufacturing inaccuracy can be compensated for.

The reciprocal supports are in an accordingly modified form also applicable to stationary regenerator chambers.

The designs shown in FIGS. 4a to 6b are intended for rotating heat storage bodies and those in FIGS. 7a to 9b for stationary regenerator chambers.

In FIGS. 10a to 11b we show how a bracket 13 on one portion may be received in a recess 14 in the periphery of the other portion. The bracket engages a plane undersurface 15 at the top of the recess through a slide plate 16, or as in FIGS. 11a and 11b, through an adjusting bolt 9, cup 11 and slide guides 12 as shown in FIGS. 6 and 9. The adjusting bolt bears the undersurface 15 at the top of the recess.

We claim:
1. Cylindrical regenerator chamber for the heat storage body of regenerative heat exchangers, with a supporting structure of annular parts, which parts may also be further sub-divided in the circumferential direction, said annular parts being concentrically arranged about an axis with radial intermediate spaces and one said part being supported by the other said part freely adjustably, axial surfaces of the supporting structure being machined concavely and convexly respectively.

2. A regenerator according to claim 1 wherein the front surfaces of the supporting structure of the heat storage body is pre-machined at the hot regenerator end substantially in a concave form when cold, whilst the opposing front surfaces on the cold end have a convex form when cold, and the heights of the concavity and convexity in cold condition are dimensioned such that under medium operating temperature the pre-machined curvatures are practically cancelled by the thermal expansions occurring in opposite direction, and that consequently almost plane regenerator surfaces will be formed under operating conditions.

3. A regenerator according to claim 2 wherein the concavity and convexity are arcuate.

4. A regenerator according to claim 2 wherein the concavity and convexity are conical.

5. A cylindrical regenerator chamber according to claim 1 wherein the annular parts of the supporting structure are supported one on the other by means of supporting brackets connected with each other by connection bolts in radial slots.

6. Cylindrical regenerator chamber according to claim 1 wherein the axial surfaces of the supporting structure, which is composed of the annular parts, are machined concavely at that surface which is the hot end and convexly at that surface which is the cold end and that the annular parts are supported one on the other by means of pairs of brackets uniformly distributed on the circumference, adjusting screws being provided for adjustment of the relative axial position of each pair of brackets.

7. A regenerator according to claim 6 wherein a bracket from the outer annular part is supported on a bracket from the inner part.

8. A regenerator according to claim 6 wherein a bracket from the inner annular part is supported on a bracket from the inner annular part.

9. Cylindrical regenerator chamber according to claim 6, the lower end of each adjusting bolt being rounded off spherically and being received in a cup which is guided for movements in radial directions.

10. Cylindrical regenerator chamber according to claim 1 wherein the annular parts are supported one by the other by means of brackets, which are supported glidingly movable against each other in radial directions by means of rollers.

11. Cylindrical regenerator chamber according to claim 1 wherein one axial part has a plurality of brackets attached to it, the brackets extending into and interengaging with recesses in the other annular part.

12. A regenerator according to claim 11 wherein the brackets are adjustably received in the recesses.

References Cited

UNITED STATES PATENTS

| | | | |
|---|---|---|---|
| 3,180,402 | 4/1965 | Moffat | 165—9 |
| 3,280,895 | 10/1966 | Chen et al. | 165—9 |
| 3,302,694 | 2/1967 | Beam, Jr. | 165—10 |
| 3,369,593 | 2/1968 | Brandt | 165—10 |

FOREIGN PATENTS

| | | | |
|---|---|---|---|
| 1,136,087 | 12/1968 | Great Britain | 165—10 |

A. W. DAVIS, JR., Primary Examiner

U.S. Cl. X.R.

165—10